United States Patent Office 3,565,822
Patented Feb. 23, 1971

3,565,822
LOW TEMPERATURE CONTROLLED POLYMERIZATION SYSTEM FOR METHACRYLATE ESTERS
Irvin Francis Bodycot, Wilmington, Del., assignor to E. I. du Pont de Nemours and Company, Wilmington, Del., a corporation of Delaware
No Drawing. Continuation-in-part of application Ser. No. 425,340, Jan. 13, 1965. This application July 20, 1967, Ser. No. 654,706
Int. Cl. C08f 3/62
U.S. Cl. 252—429      10 Claims

ABSTRACT OF THE DISCLOSURE

A low temperature, controlled polymerization of methyl methacrylate ester systems containing methyl methacrylate peroxide or other active oxygen can be achieved by the introduction of a specialized accelerator which accelerates the breakdown of methyl methacrylate peroxide to provide catalyzing free radicals in the system. The accelerator is comprised of an oxidizable sulfur compound, copper, an organic amine or amine salt, and a salt of either cerium, manganese, cobalt, nickel, mercury, germanium, tin or antimony.

---

This application is a continuation-in-part of application Ser. No. 425,340, to the same inventor, filed Jan. 13, 1965 and now abandoned.

This invention relates to the polymerization of methacrylate esters, and more particularly, it relates to the polymerization of methacrylate esters without the use of conventional free radical catalysts.

Methyl methacrylate is widely used in the formation of resins which are free from color and exhibit glass-like clarity. Such resins which are commercially available include the conventional molding powders which may be fabricated by means of a variety of molding procedures. Often, however, methyl methacrylate is converted directly to desired shaped structures by a casting technique in which the monomer is polymerized in a single or in a plurality of stages in a suitable container which provides the ultimate shape desired. One of the principal difficulties in this type of composite polymerization-fabrication is the absence of control over the polymerization reaction, i.e., the rate at which the polymerization is effected. That stage of the polymerization during which control is difficult or impossible sometimes is known as "run away"; this phenomenon results in the shaped structure having poor physical properties, soft centers, voids, and other imperfections. In an effort to control "run away" certain expedients have been found useful, such as the raising of the temperature gradually or taking steps to insure effective heat transfer. These expedients are quite limited, however, due to the fact that the thermal conductivity of the monomer and polymer is low and further, because the gelation which occurs early in the polymerization retards convection currents and thus precludes adequate heat transfer. Still another complicating factor in the polymerization of methyl methacrylate is the unusual effect which is observed when the polymerization is conducted in the presence of oxygen. Under such conditions the monomer preferentially combines with oxygen to form methyl methacrylate peroxides, or as they are sometimes known, a methyl methacrylate/oxygen copolymer. These peroxides or copolymers are sufficiently stable to provide inhibition during the preliminary phase of the polymerization. Once active polymerization of methyl methacrylate commences, and the temperature rises above about 90° C., the reaction becomes extremely violent since the initially formed peroxides now further catalyze the polymerization. Although efforts have been made to achieve improved control over this phase of the reaction through use of polymerization accelerators to facilitate decomposition of the methyl methacrylate peroxides, to date no such accelerator has been found that is useful in this system.

SUMMARY OF THE INVENTION

Methyl methacrylate peroxide is relatively stable even at temperatures as high as 90° C. as exemplified by the fact that even at 90° C. polymerization does not set in for many hours. Below 90° C. methyl methacrylate peroxide will decompose only in the presence of an initiator comprised of an oxidizable sulfur compound, copper, an organic amine or amine salt, and a salt of either cerium, manganese, cobalt, nickel, mercury, germanium, tin or antimony. As the methyl methacrylate peroxide decomposes, more methyl methacrylate peroxide is formed from free oxygen and methyl methacrylate to sustain the rate of polymerization. In a normal free-radical polymerization the rate would fall off as a function of time as the catalyst is consumed.

It is an object of this invention to provide a process for the polymerization of methacrylate esters. It is a further object to provide a methacrylate ester polymerization process which employs a polymerization accelerator to provide in-situ catalyst formation. Still another object is to provide a methacrylate polymerization process which is amenable to precise control of the polymerization conditions. It is a still further object of this invention to provide a "run away"-free methacrylate polymerization process which requires no added catalysts and which, therefore, is markedly safer to carry out. Another object is to provide a methacrylate polymerization process which can be effected at low temperatures. It is another object of this invention to provide a more economical process for the preparation of methacrylate castings by eliminating the use of the conventional monomer-polymer sirups which contain methacrylate bead polymer. Other objects will become apparent hereinafter.

The objects of the instant invention are achieved by means of a methacrylate ester polymerization system which is comprised of a methacrylate ester peroxide, or a combination of a methacrylate ester and oxygen which can provide a methacrylate ester peroxide, and an accelerator therefor, namely, an oxidizable sulfur compound, copper, an organic amine or amine salt and a salt of either cerium, manganese, cobalt, nickel, mercury, germanium, tin or antimony. Each of the components of the accelerator of the polymerization system will be discussed in detail.

In the present invention only trace quantities of active oxygen, in the form of a methacrylate ester peroxide, are required to initiate polymerization. Larger quantities of oxygen can be employed, either as dissolved oxygen or in the form of the methacrylate ester peroxide. Further, since the polymerization generally is conducted in air, oxygen will be incorporated into the system by diffusion. The initial active oxygen content, i.e., that which has been or is convertible to methacrylate peroxide, of the polymerization system may be as low as about 0.0001 weight percent (1 p.p.m.) of the reaction system. The upper limit of active oxygen content may be varied. To provide maximum control of the polymerization, however, it preferably should not exceed 3 percent. The present invention is operable in any methacrylate polymerization system, but especially in those wherein the methacrylate readily forms a peroxide. Exemplifying this latter type are the aliphatic and cycloaliphatic methacrylates, and especially methyl methacrylate and cyclohexyl methacrylate.

Another component of the polymerization mixture is a readily oxidizable sulfur compound. Although a wide variety of sulfur compounds have been found operable herein, organic mercaptans and mercapto derivatives have been found to be especially suitable, e.g., alkyl mercaptans and glycol mercaptoacetates. Lauryl mercaptan, butyl mercaptan and ethylene glycol dimercaptoacetate are representative of those oxidizable sulfur compounds which are especially preferred herein. The amount of mercaptan, calculated in terms of sulfur, generally lies in the range of 0.008 to 0.32 weight percent of the polymerization mixture, and preferably 0.015 to 0.11 weight percent. These percentages of sulfur correspond to 0.05 to 2.0 weight percent, and preferably 0.1 to 0.7 weight percent, when lauryl mercaptan is employed.

A third requirement in the polymerization medium is copper, preferably in the form of a compound which is soluble in the reaction mixture. Only extremely small quantities are required and although in fact it has been noted that trace quantities such as may be present as a result of chance contamination are adequate, copper must be present in the system or the methacrylate peroxide will not decompose. Generally, the amount of copper salt added is adjusted so as to provide from about 0.02 to about 10 p.p.m., based on the total weight of the polymerization system, of copper. Preferred herein are soluble copper compounds wherein the copper is in the valence state of two. Exemplary of a particularly preferred copper compound is cupric naphthenate.

There also must be present in the polymerization mixture an organic amine which is soluble in the reaction mixture. As long as solubility is maintained, the amine may be added either as the free amine or as an amine salt and in fact, the latter is sometimes preferred to facilitate the solubilization of other components in the system. The amine hydrohalides are especially suitable as amine salts. A wide variety of aromatic or aliphatic primary, secondary or tertiary amines or amine salts are operable, the only requirement being solubility in the polymerization medium. Particularly suitable materials are the following free amines or their hydrochlorides or hydrobromides: tribenzyl amine, N,N-diethyl aniline, N-methyl aniline and N,N-dibutyl-$\beta$-phenylethylamine. The requisite amount of amine or amine salt is extremely small. Only 0.0004 to 0.025 weight percent of amine or amine salt, calculated as nitrogen, need be present in the reaction system.

Finally, the polymerization medium must contain a soluble salt of one of the following elements; namely, cerium, manganese, cobalt, nickel, mercury, germanium, tin or antimony. By soluble, just as hereinabove, is meant either initially soluble in the reaction mixture, or solubilized when the material is brought into contact with the other components of the system. Preferred herein are the salts of tin because they provide the best combination of high cure rate and low color. Especially preferred are the stannous salts, and particularly stannous chloride, since they provide the additional advantages of high solubility and low cost. Only extremely small quantities of the metal salt are required. The amount added is adjusted so as to provide $5.5 \times 10^{-6}$ to $3.3 \times 10^{-4}$ gram atomic weight percent of the metal ion. When stannous chloride dihydrate is employed, the amount utilized is 0.00124 to 0.0744 weight percent of the total polymerization mixture. Copper salt in the same quantity as the abovementioned heavy metal elements will also effect polymerization, but in these large quantities it produces an undesirable coloration of the resin.

In preparing the polymerization mixture it is convenient to add the amine salt and the metal salt as a solution in a suitable solvent. Solvents which are useful for the formation of the solution are organic hydroxylic compounds such as methanol, ethylene glycol, propylene glycol, and the like. By employing such solvents concentrated solutions may be prepared, thus permitting the volume of the solution added to be kept to a minimum. The state of the amine and metal salts and the hydroxylic solvent in the solution is not fully understood but it is believed that a stable reaction product or complex is formed.

Although one of the objects of this invention is to provide a polymerization process which does not require the use of conventional methacrylate polymerization catalysts, as indicated above, the use of such catalysts is not precluded. Thus, if an even faster cure rate is desired, conventional free radical catalysts may be added. Moreover, although the instant invention is directed primarily to the polymerization of methyl methacrylate through utilization of methyl methacrylate peroxides, the decomposition of other stable peroxidic materials likewise may be effected by means of the accelerator system of the present invention. Hence, although the instant accelerator is the only known useful system for the decomposition of methyl methacrylate peroxides, it also can be employed for methacrylate polymerizations generally, even though no methyl methacrylate peroxides are present.

Even though the mechanism of operation of the accelerator system of the present invention is unknown, some speculation may be made as to the effect of its operation. It is known from the prior art that "run away" in a normal methyl methacrylate bulk polymerization occurs when the viscosity of the polymerization medium increases to such an extent that the movement of the active groups is retarded and collision frequency is reduced, the net effect being that the bimolecular termination reaction is retarded and the net polymerization rate is increased. In the present invention when the viscosity of the polymerization medium is increased, there is a corresponding decrease in the diffusion rate of oxygen, an essential component of the accelerator system, with the result that the polymerization rate is reduced and "run away" is precluded. Moreover, since the instant polymerizations are conducted in air, there is a higher concentration of oxygen and, therefore, a higher polymerization rate, at the surface. Still further in the instant invention, the loss of monomer through evaporation occurs principally at the surface, thus providing a polymer-rich surface. Since both these phenomena provide a higher concentration of polymer at the surface, oxygen diffusion from the atmosphere is further retarded and control over the polymerization is increased. Although the aforesaid description has ben given for a bulk polymerization process, the instant invention is equally applicable to a continuous polymerization process wherein control is achieved by regulating the amount of dissolved oxygen in the feed.

By means of the present invention there is now available an economical process for the fabrication of large castings without having recourse to the conventional monomer-polymer sirups which contain as one of the components methyl methacrylate bead polymer. The process is equally amenable to the use of such sirups, however, where expediency dictates their use. Moreover, utilization of the present invention precludes the necessity for incorporating conventional methyl methacrylate polymerization catalysts. Since the polymerization can be carried out at low temperatures, for example, room temperature, the process is amenable to the use of heat sensitive dyes which heretofore could not be incorporated into polymerization systems because elevated temperatures were required for their operation. The present invention not only is important in terms of catalyst cost savings, but it provides a safety factor which cannot be realized in those polymerization systems which normally require the use of sensitive peroxidic materials. As a result the instant polymerization system is especially suited for use by non-professionals such as hobbyists who may utilize the invention in home work shops.

The following examples are intended to illustrate, but not limit, the process of the present invention. Unless otherwise stipulated, all percentages are on a weight basis and all monomer-polymer sirups contain 25 p.p.m. of hydroquinone as inhibitor. It is to be understood, however, that either inhibited or uninhibited monomer or monomer-polymer sirup may be employed in the process of the present invention.

EXAMPLE I

In this and subsequent examples that which is referred to as Solution A is prepared as follows: A solution of 16.66 parts by weight of N,N-dibutyl-β-phenylethylamine hydrochloride in an equal weight of chemically pure methyl alcohol is combined with a second solution of 2.48 parts by weight of stannous chloride dihydrate in 64.20 parts by weight of propylene glycol to form a stable homogeneous solution.

To each of a series of 20 gram vials are added 10 grams of inhibitor-free methyl methacrylate, 0.1 to 0.5 percent of Solution A, 0.5 to 5 percent of ethylene glycol dimethacrylate, 0.5 to 1.0 percent of lauryl mercaptan, 0.02 p.p.m. to 0.1 p.p.m. of copper as copper naphthenate. To a separate vial, as a control, are added 10 grams of inhibitor-free methyl methacrylate, 0.1 percent of antimony trichloride and 30 p.p.m. of copper chloride, the latter two as a solution in alcohol. The vials are exposed to the atmosphere at ambient conditions. After 3 hours all of the mixtures containing Solution A have achieved hardness. The control sample is still liquid after 24 hours.

EXAMPLE II

A mixture of 25 grams of inhibitor-free methyl methacrylate, 5 percent of ethylene glycol dimethacrylate, 0.6 percent of lauryl mercaptan, 0.5 percent of Solution A, and 0.02 p.p.m. of copper as copper naphthenate is poured into an aluminum dish 2 inches in diameter and 0.5 inch in depth. After 90 to 100 minutes a medium hard transparent non-tacky casting is removed from the aluminum dish. Curing is continued and after 8 hours a very hard casting is obtained.

EXAMPLE III

Into a 4-ounce wide-mouth jar is placed 50 grams of a methyl methacrylate monomer-polymer sirup having a viscosity of 15 poises, a 30 percent polymer content, and 0.15 percent of ethylene glycol dimercaptoacetate; to the mixture is added 0.5 percent of Solution A, 1.0 percent of ethylene glycol dimethacrylate, and 0.02 p.p.m. of copper as copper naphthenate. A second sample is prepared as above except that the ethylene glycol dimethacrylate is not added. Both jars are left open to the atmosphere under ambient conditions. After 2.5 hours the contents of both jars have a firm, non-flowing consistency. After 3 hours curing has advanced to the hard, non-tacky stage. The similarity between the products of the two experiments demonstrates that the cross-linking agent, namely, ethylene glycol dimethacrylate is not essential in preparing methyl methacrylate castings by the process of the instant invention.

EXAMPLE IV

A series of mixtures comprised of a methyl methacrylate monomer-polymer sirup having a viscosity of 15 poises, containing about 30 percent dissolved polymer, 0.15 percent of ethylene glycol dimercaptoacetate, 1.25 percent of ethylene glycol dimethacrylate, p.p.m. of copper as copper naphthenate and 1.8 p.p.m. of active oxygen in the form of methyl methacrylate peroxide is assembled in six 4-ounce wide-mouth jars. As the sixth component of each mixture, respectively, the following are added at a level of 0.25 percent: stannous chloride dihydrate; N,N-dibutyl-β-phenylethylamine hydrochloride; Solution A; a 3 percent solution of stannous chloride in propylene glycol; a substantially alcohol solution containing 20 percent of antimony trichloride and about 0.6 percent of copper chloride; an alcohol solution containing about 13 percent of antimony trichloride and 0.5 percent of copper naphthenate. After vigorous stirring of the contents of each jar for 10 seconds to insure uniform dispersal of the components, the samples are transferred to six aluminum dishes having a diameter of 2.25 inches and a depth of 0.75 inch. The dishes are left open to the atmosphere under ambient conditions. After three hours the sample containing Solution A is sufficiently polymerized so that it is able to support the weight of a small spatula without deformation, whereas the other five samples are still liquid. After 24 hours the same five samples are still liquid while that containing Solution A has provided an excellent hard casting.

EXAMPLE V

Into each of three 4-ounce wide-mouth jars is placed 50 grams of inhibitor-free methyl methacrylate monomer-polymer sirup containing about 30 percent polymer, 0.02 p.p.m. copper, and 1.8 p.p.m. of active oxygen. Into sample 1 is admixed 0.3 percent of Solution A, into sample 2, 0.3 percent of Solution A and 0.1 percent of ethylene glycol dimercaptoacetate, and into sample 3, 0.5 percent of Solution A and 0.1 percent of ethylene glycol dimercaptoacetate. The latter two samples are completely hard after 3.5 hours. After 48 hours sample 1 is still liquid and unpolymerized.

EXAMPLE VI

Example V is repeated using butyl mercaptan in place of the dimercaptoacetate; comparable results are achieved.

EXAMPLE VII

Example V is repeated using lauryl mercaptan in place of the dimercaptoacetate; similar results are realized.

EXAMPLE VIII

In order to prepare a peroxide-rich methyl methacrylate, 500 grams of inhibitor-free methyl methacrylate is placed in a 1,000 cc. three-neck distillation flask equipped with a water condenser, gas dispersion tube and air driven stirrer. The flask is half immersed in a 50° C. water bath and 0.82 gram of α,α'-azobis(butyronitrile) is added to initiate peroxide formation. Oxygen is bubbled through the heated monomer using a moderate bubbling rate for 24 hours. The peroxide-enriched monomer is stored under refrigeration until needed. Analysis shows that the active oxygen level in the monomer is now 0.11 percent as compared to 0.0017 percent for the inhibitor-free starting material.

To a 4-ounce wide-mouth jar are added 25 grams of the methyl methacrylate peroxide prepared hereinabove and 25 grams of the methyl methacrylate monomer-polymer sirup described in Example IV. To a second 4-ounce wide-mouth jar are added 25 grams of the monomer-polymer sirup described in Example IV and 25 grams of inhibitor-free methyl methacrylate. To each of the jars is added 0.5 percent of Solution A and the contents are hand stirred with a stainless steel spatula for 10 seconds to insure uniform dispersal of all components. The jars are exposed to the atmosphere under ambient conditions. The sample containing the perovide-enriched monomer is completely polymerized with no surface tackiness within 2.5 hours. During the polymerization considerable heat is developed and boiling is noted. The control sample is polymerized to complete hardness after 5 hours, although the exothermicity of the reaction is insufficient to provide any boil-off.

EXAMPLE IX

To each of four 1-ounce wide-mouth bottles is added 10 grams of methyl methacrylate monomer-polymer sirup having a viscosity of 15 poises, containing about 30 percent polymer, 0.15 percent of ethylene glycol dimercaptoacetate, 1.25 percent of ethylene glycol dimethacrylate, and about 1 p.p.m. of copper as copper naphthenate. To the first bottle is added 10 grams of the peroxide-enriched methyl methacrylate prepared in Example VIII and to which has been added 1.25 percent of ethylene glycol dimethacrylate. To bottle number two is added 5 grams of freshly distilled, inhibitor-free methyl methacrylate containing 0.00017 percent active oxygen as methyl methacrylate peroxide and to which has been added 1.25 percent of ethylene glycol dimethacrylate. Also added to bottle number two is 5 grams of the methyl methacrylate peroxide prepared in Example VIII and to which has been added 1.25 percent of ethylene glycol dimethacrylate. To bottle number three is added 7.5 grams of freshly distilled, inhibitor-free, methyl methacrylate containing 0.00017 percent active oxygen as methyl methacrylate peroxide and to which has been added 1.25 percent of ethylene glycol dimethacrylate. Also added to bottle number three is 2.5 grams of the methyl methacrylate peroxide prepared in Example VIII and to which has been added 1.25 percent of ethylene glycol dimethacrylate. To bottle number four is added 10 grams of freshly distilled, inhibitor-free, methyl methacrylate containing 0.00017 percent active oxygen as methyl methacrylate peroxide and to which has been added 1.25 percent of ethylene glycol dimethacrylate. The four samples contain respectively the following percentages of methyl methacrylate peroxides: 0.0550; 0.0276; 0.0138; 0.0002. To the mixture in each bottle is added 0.5 percent of Solution A. A thermometer is placed in each bottle after the contents are thoroughly mixed and the time to reach 50° C. is recorded for each. A plot of 1/Time vs. percent concentration of methyl methacrylate peroxides provides a straight line function.

EXAMPLE X

To a 100 ml. beaker are added 50 grams of the methyl methacrylate monomer-polymer sirup described in Example IV, 0.10 gram of a 4 weight percent germanium tetrachloride solution in methyl alcohol and 0.15 gram of tribenzylamine. After stirring the contents the beaker is allowed to remain open to the atmosphere at ambient conditions. Jelling occurs with mild exotherm after about two hours and a rigid transparent colorless polymethyl methacrylate casting is obtained after about 4 hours.

EXAMPLE XI

To a 100 ml. beaker are added 50 grams of the methyl methacrylate monomer-polymer sirup described in Example IV, 0.10 gram of a 4 weight percent stannous bromide solution in methyl alcohol and 0.15 gram of a 25 weight percent solution of N,N-dibutyl-$\beta$-phenylethylamine hydrochloride in methyl alcohol. After stirring the contents the beaker is allowed to remain open to the atmosphere at ambient conditions. After three hours the sirup has jelled with mild exotherm and a rigid transparent colorless polymethyl methacrylate casting is obtained within 24 hours.

EXAMPLE XII

To a 100 ml. beaker are added 50 grams of the methyl methacrylate monomer-polymer sirup described in Example IV, 0.10 gram of a 3.8 weight percent solution of stannous chloride in methyl alcohol, and 0.15 gram of pyridine. Upon addition of the pyridine a white precipitate is noted. Although the contents of the beaker are exposed to the atmosphere under ambient conditions for four days, very little polymerization takes place, demonstrating the importance of maintaining complete solubilization of all the components in the system of the instant invention.

EXAMPLE XIII

To a 100 ml. beaker are added 50 grams of the methyl methacrylate monomer-polymer sirup described in Example IV, 0.10 gram of a 4 weight percent solution of stannous oxalate in methyl alcohol, and 0.15 gram of a 25 weight percent solution of N,N-dibutyl-$\beta$-phenylethylamine hydrochloride in methyl alcohol. The absence of complete solubilization of components is noted during the initial stages of the polymerization. Within 24 hours, however, a firm casting is obtained. When the experiment is repeated using the free amine rather than the amine hydrochloride, no polymerization is noted, demonstrating the fact that in the former experiment the insoluble stannous oxalate is converted to stannous chloride by the hydrochloric acid present in the system, thus providing the requisite complete solubilization of components necessary for polymerization.

EXAMPLE XIV

Example XIII is repeated using stannous fluoride in place of the stannous oxalate. Results similar to Example XIII are achieved in both the experiments of this example.

EXAMPLE XV

Example XIII is repeated using stannous sulfate in place of the stannous oxalate. Results similar to Example XIII are achieved in both experiments of this example.

EXAMPLE XVI

Example XIV is repeated using 0.15 gram of tribenzylamine in place of N,N-dibutyl-$\beta$-phenylethylamine hydrochloride. Just as in the second experiment of Example XIV, the system remains cloudy, and no polymerization occurs, even though the time period is extended to 5 days.

EXAMPLE XVII

To each of a series of 100 ml. beakers are added 50 grams of the methyl methacrylate monomer-polymer sirup described in Example IV, 0.2 gram of a 3.8 percent solution of stannous chloride dihydrate in methyl alcohol, and 0.2 gram of a solution of an amine in methyl alcohol. The amines employed and the result of each experiment are tabulated below.

| Amine | Weight percent amine in methyl alcohol | Result |
| --- | --- | --- |
| Tribenzylamine | 26.6 | Hard cure in 4 hours. |
| N,N-dimethyl-p-toluidine | 9.2 | Firm in 4 hours. |
| N,N-diethylaniline | 13.8 | Hard cure in 2.75 hours. |
| N-methylaniline | 9.9 | Hard cure in 4 hours. |
| N-methyl-p-toluidine | 11.2 | Do. |
| N-N-dimethylaniline | 11.2 | Firm in 4 hours. |
| Triethylamine | 9.3 | Soft cure in 4 hours. |
| N-N-dimethylcyclohexyl amine hydrochloride. | 15.2 | Firm in 4 hours. |
| Trimethylamine hydrochloride | 20.5 | Do. |
| Diethylamine hydrochloride | 17.5 | Do. |
| Methylamine hydrochloride | 6.2 | Do. |
| N,N-diethylaniline hydrochloride. | 17.2 | Hard cure in 4 hours. |

EXAMPLE XVIII

To a 100 ml. beaker are added 50 grams of the methyl methacrylate monomer-polymer sirup described in Example IV, 0.10 gram of a 3.8 percent solution of stannous chloride dihydrate in methyl alcohol, 0.15 gram of a 25 weight percent solution of N,N-dibutyl-$\beta$-phenylethylamine hydrochloride in methyl alcohol, and 100 p.p.m. of hydroquinone. After the contents are stirred to insure dispersal of the components the beaker is allowed to remain open to the atmosphere under ambient conditions. Within 24 hours a firm casting is obtained.

EXAMPLE XIX

To a 100 ml. beaker are added 50 grams of the methyl methacrylate monomer-polymer sirup described in Example IV, 0.10 gram of a 4 weight percent vanadium trichloride solution in methyl alcohol, and 0.15 gram of a 25 percent solution of N,N-dibutyl-$\beta$-phenylethylamine hydrochloride in methyl alcohol. After stirring the mixture to insure dispersal of the components, the beaker is allowed to remain open to the atmosphere at ambient conditions. A hard casting is realized within about 5 hours.

EXAMPLE XX

To a 100 ml. beaker are added 50 grams of the methyl methacrylate monomer-polymer sirup described in Example IV, 0.10 gram of a 4 weight percent solution of stannous bromide in methyl alcohol, and 0.10 gram of a 4 weight percent solution of tribenzylamine in methyl methacrylate. The mixture is stirred to insure dispersal of the components and the beaker is allowed to stand open to the atmosphere under ambient conditions. After about 3 hours a hard casting is obtained.

EXAMPLE XXI

To a 100 ml. beaker are added 50 grams of the methyl methacrylate monomer-polymer sirup described in Example IV, 0.05 gram of Solution A, and 0.05 gram of methyl ethyl ketone peroxide. The mixture is stirred to insure complete dispersal of the components and then allowed to stand open to the atmosphere under ambient conditions. The mixture solidifies in about one hour and within two hours a hard transparent casting is obtained.

EXAMPLE XXII

To a 20 ml. glass vial are added 10 ml. of cyclohexyl methacrylate inhibited with 25 p.p.m. of hydroquinone, 2.0 percent of ethylene glycol dimethacrylate, 0.75 percent of lauryl mercaptan, and 1 p.p.m. of copper as copper naphthenate. A second vial is set up so as to contain the same components, and in addition, 0.5 percent of Solution A. Within 2 hours the contents of the second vial are polymerized to a semi-hard state, while the contents of the first vial are still unpolymerized.

EXAMPLE XXIII

To a 20 ml. glass vial are added 10 ml. of cyclohexyl methacrylate inhibited with 25 p.p.m. hydroquinone, 2.0 percent of ethylene glycol dimethacrylate, 0.75 percent of lauryl mercaptan, 2.0 percent of methyl ethyl ketone peroxide, and 1 p.p.m. of copper as copper naphthenate, and 0.5 percent of Solution A. The vial is allowed to remain open to the atmosphere under ambient conditions. A hard casting is obtained in about 10 minutes.

EXAMPLE XXIV

To each of eight 2-ounce wide-mouth jars are added 50 grams of the monomer-polymer sirup described in Example IV, 0.2 percent of a 50 percent solution of N,N-dibutyl-$\beta$-phenylethylamine hydrochloride in methyl alcohol, and 0.4 percent of an approximately 0.5 mole percent methanolic solution of one of the following salts: cerous chloride, manganese chloride tetrahydrate, cobaltous chloride hexahydrate, nickel chloride hexahydrate, copper stearate (in which case the copper naphthenate is not added to the monomer-polymer sirup described in Example IV), mercuric bromide, stannic chloride or antimony trichloride. All of the metal salts are effective in promoting the cure of the sirup, with stannic chloride being the preferable salt based upon a combination of speed of cure and freedom from color.

What is claimed is:

1. A free radical producing source comprising methacrylate peroxide and the decomposition accelerator for said free radical producing source for use in methacrylate ester polymerization systems, consisting essentially of 1 p.p.m. −3% of at least one member of the group consisting of alkyl methacrylate peroxide, cycloalkyl methacrylate peroxide, a mixture of alkyl methacrylate peroxide and oxygen and a mixture of cycloalkyl methacrylate peroxide and oxygen; 0.008–0.32 weight percent of a sulfur compound calculated in terms of sulfur in the form of at least one member of the group consisting of alkyl mercaptans and glycol mercaptoacetates; 0.02 p.p.m. to 10 p.p.m. of copper in the form of a cupric salt; 0.004–0.025 weight percent calculated as nitrogen of at least one member of the group consisting of tribenzylamine, N,N diethyl analine, N methylanaline, N,N-dibutyl-$\beta$-phenylethyl amine, N,N-dimethyl p-toluidine, N,N-dimethylanaline, triethylamine, N,N-dimethylcyclohexyl amine, trimethyl amine, diethylamine, N,N diethyl analine and the hydrohalides thereof; and $5.5 \times 10^{-6}$ to $3.3 \times 10^{-4}$ gram atomic weight percent calculated as metal selected from the group consisting of halides and sulfates of metal selected from the group consisting of cerium, manganese, cobalt, nickel, mercury, germanium, tin and antimony, all weights based upon total weight of the components of the free radical producing source-decomposition accelerator polymerization system.

2. The free-radical producing source and decomposition accelerator of claim 1 where sulfur is present in the form of ethylene glycol dimercaptoacetate.

3. A free radical producing source and decomposition accelerator of claim 1 wherein the metal is tin.

4. The free-radical producing source and decomposition accelerator of claim 3 wherein the peroxide is methyl methacrylate peroxide.

5. The free-radical producing source and decomposition accelerator of claim 3 wherein the sulfur compound calculated in terms of sulfur comprises 0.015 to 0.11 weight percent and the salt of tin is a halide salt of tin.

6. The free-radical producing source and decomposition accelerator of claim 3 wherein the sulfur compound is an alkyl mercaptan, the copper salt is copper naphthenate, the amine is a tertiary amine and the salt of tin comprises 0.00124 to 0.0744 weight percent of stannous chloride dihydrate.

7. The free-radical producing source and decomposition accelerator of claim 6 wherein the active oxygen is in the form of a methyl methacrylate peroxide, the alkyl mercaptan is lauryl mercaptan, and the tertiary amine is N,-N-dibutyl-$\beta$-phenylethylamine hydrochloride.

8. The free-radical producing source and decomposition accelerator of claim 3 wherein the salt of tin is stannous halide.

9. A decomposition accelerator for methacrylate ester peroxide for use in methacrylate polymerization systems comprising 0.008–0.32 weight percent sulfur in the form of at least one member of the class consisting of alkyl mercaptans and glycol mercaptoacetates; 0.02 p.p.m. to 10 p.p.m. of copper in the form of a cupric salt; 0.004–0.025 weight percent calculated as nitrogen of at least one member of the group consisting of tribenzylamine, N, N diethyl analine, N methylanaline, N,N-dibutyl-$\beta$-phenylethyl amine, N,N-dimethyl p-toluidine, N,N-dimethylanaline, triethylamine, N,N-dimethylcyclohexyl amine, trimethyl amine diethylamine, N,N diethyl analine and the hydrohalides thereof; and $5.5 \times 10^{-6}$ to $3.3 \times 10^{-4}$ gram atomic weight percent calculated as metal selected from the group consisting of halides and sulfates of metal selected from the group consisting of cerium manganese, cobalt, nickel, mercury, germanium, tin and antimony, all weights based upon total weight of the components of the free radical producing source-decomposition accelerator polymerization system.

10. The decomposition accelerator of claim 9 wherein the metal is tin.

References Cited

UNITED STATES PATENTS

| | | | |
|---|---|---|---|
| 2,687,395 | 8/1954 | Marks | 260—89.5(A) |
| 3,154,600 | 10/1964 | Munn | 260—89.5(A) |
| 3,166,539 | 1/1965 | Schurchardt | 260—89.5(A) |
| 3,200,103 | 8/1965 | Chadha | 260—89.5(A) |

FOREIGN PATENTS

| | | | |
|---|---|---|---|
| 792,812 | 4/1958 | Great Britain | 260—89.5(A) |

PATRICK P. GARVIN, Primary Examiner

U.S. Cl. X.R.

252—428; 260—89.5